United States Patent [19]

Seidner

[11] Patent Number: 5,493,350
[45] Date of Patent: Feb. 20, 1996

[54] MULTIPOCAL CONTACT LENS AND METHOD FOR PREPARING

[76] Inventor: Leonard Seidner, 4 Walden Ct., Manalapan, N.J. 07726

[21] Appl. No.: 111,845

[22] Filed: Aug. 25, 1993

Related U.S. Application Data

[63] Continuation-in-part of Ser. No. 40,422, Mar. 31, 1993, Pat. No. 5,404,183.

[51] Int. Cl.$^6$ ............................................. G02C 7/04
[52] U.S. Cl. ............................................. 351/161; 351/177
[58] Field of Search ............................................. 351/160 R, 160 H, 351/161, 162, 177

[56] References Cited

U.S. PATENT DOCUMENTS

| | | | |
|---|---|---|---|
| 3,482,906 | 12/1969 | Volk | 351/161 |
| 4,418,991 | 12/1983 | Breger | 351/161 |
| 4,525,043 | 6/1985 | Bronstein | 351/161 |
| 4,636,049 | 1/1987 | Blaker | 351/161 |
| 4,640,595 | 2/1987 | Volk | 351/161 |
| 4,752,123 | 6/1988 | Blaker | 351/161 |
| 4,765,728 | 8/1988 | Porat et al. | 351/161 |
| 4,883,350 | 11/1989 | Muckenhirn | 351/161 |
| 4,890,912 | 1/1990 | Visser | 351/161 |
| 4,936,672 | 6/1990 | Capez | 351/161 |
| 4,971,432 | 11/1990 | Koeniger | 351/161 |
| 5,181,053 | 1/1993 | Brown | 351/162 |

*Primary Examiner*—Scott J. Sugarman
*Attorney, Agent, or Firm*—R. Neil Sudol; Henry D. Coleman

[57] ABSTRACT

A multifocal contact lens customized for a patient includes a central portion having a concave aspherical posterior surface of a standardized eccentricity and an annular portion connected to the central portion. The central portion also has a convex anterior surface with a power curve customized to the patient. The annular portion is provided with an aspheric annular cornea-fitting posterior surface and has an outer edge with a centralized apex, whereby the annular portion may be formed at the outer edge to be entrainable by a patient's eyelid to shift the lens relative to the patient's eye to vary which portion of the power curve is used during vision. The contact lenses according to the invention may be rigid or soft (hydrogels).

29 Claims, 1 Drawing Sheet

MULTIFOCAL CONTACT LENS AND METHOD FOR PREPARING

CROSS-REFERENCE TO A RELATED APPLICATION

This application is a continuation-in-part of application Ser. No. 040,422 filed Mar. 31, 1993 now U.S. Pat. No. 5,404,183.

BACKGROUND OF THE INVENTION

This invention relates to a method for use in preparing a customized multifocal contact lens. This invention also relates to a multifocal contact lens produced using such a method.

Bifocal contact lenses are designed to correct or compensate for a condition of advancing age known as "presbyopia." In a presbyopic eye, the ability to focus at near distances, such as the normal reading distance, and in some cases at great distances, is diminished. The loss of focusing capability is due to hardening of the eye's natural crystalline lens material.

Generally, multifocal contact lenses (usually either bifocal, trifocal or aspheric) are concentric or segmented in configuration. In a conventional bifocal contact lens of the concentric type, a first, centrally located, circular correction zone constitutes either distant or near vision correction, while a second annular correction zone surrounding the first zone provides the corresponding near or distance vision correction, respectively. In a conventional bifocal contact lens of the segmented or translating type, the lens is divided into two somewhat D-shaped zones. Usually the upper area is for distant vision correction, whereas the lower area is for near vision correction. Such conventional segmented contact lenses require some sort of shifting of the lens relative to the eye to achieve acceptable visual acuity for both distant and near vision.

The generally accepted method of fitting contact lenses is based on taking so called K readings (which measure the center of the cornea) and fitting the center of the contact lens in a predetermined relationship to those readings.

In all conventional bifocal fitting techniques, the bifocal or multifocal contact lenses is optimally designed to be particularly positioned on the cornea. However, it is very difficult in many cases, to position the lens to achieve the required fit. In general, the hardest part of fitting a lens is to position the lens at a desired location on the patient's cornea.

Precise fitting of a bifocal contact lens to the eye is crucial in so called simultaneous vision contact lenses where the brain receives both near and far vision input and selects between the near vision input and the far vision input, depending on the desired object(s) of perception.

As mentioned above, the segmented bifocal contact lenses translate to some extent on the eye. Such lenses cannot be locked onto the cornea. However, for good vision, some stability is necessary.

OBJECTS OF THE INVENTION

An object of the present invention is to provide a method for use in preparing or manufacturing a multifocal contact lens.

Another object of the present invention is to provide such a method which eliminates the need to position, or to center, a customized multifocal lens on the patient's eye.

Yet another object of the present invention is to provide such a method which utilizes a standardized diagnostic or fitting lens having an aspheric posterior surface.

Another, more particular, object of the present invention is to provide such a method which is conceptually simple and easy to implement.

A further object of the present invention is to provide a multifocal contact lens which is not necessarily centered in its normal use position(s) on the eye.

Another particular object of the present invention is to provide such a multifocal contact lens which is made from a standard polymer material having standard surfaces.

Yet another object of the present invention is to provide such a lens which has a central portion with an aspheric posterior surface.

These and other objects of the present invention will be apparent from the drawings and detailed descriptions herein.

SUMMARY OF THE INVENTION

The present invention is directed principally to a method for use in preparing a customized multifocal contact lens wherein a standard diagnostic contact lens is first placed on the patient's eye and allowed to seat itself in a natural position. In a following step, an over-refraction is then performed to determine a power curve for the lens. The patient is fitted with a lens having the same posterior profile as the diagnostic lens and an anterior profile (power curve) determined by the results of the over-refraction procedure. In many instances a single power curve over the entire anterior portion of the lens will provide adequate near and far distance vision.

Generally, the diagnostic lens has an annular portion with a concave cornea-fitting posterior surface and a central portion with a predetermined convex anterior surface (of known value) and a concave aspherical posterior surface of predetermined eccentricity. Upon placement of the diagnostic contact lens on the cornea of a patient's eye so that the fitting surface is in substantial alignment with the cornea, the diagnostic contact lens usually aligns itself with the cornea in an off-center position. Over-refraction will indicate the power curve to be cut on the anterior side of this lens. In certain cases, it may be necessary to provide further modification of the lens in order to provide both near and far distance vision.

Where the patient requires more of an "add" to obtain adequate near vision correction, two solutions are possible. In one solution, a lenticular area of the lens is provided with a second power curve for near vision correction. The second power curve is a spherical anterior surface of different radius of curvature than that of the spherical anterior surface of the center of the lens. In this case, a second over-refraction procedure is performed using the same diagnostic lens. In a second solution, instead of a single, conventially spheric, power curve, the anterior face of the lens is provided with an aspheric power curve. Preferably, an aspheric power curve will have an eccentricity less than about 0.6 and possibly as little as 0.1.

In addition to the above methods, in order to enhance the add for near vision, a different diagnostic lens having a flatter fit also may be used. In this method, an over-refraction procedure is also performed on the different diagnostic lens to determine the power curve(s) for the anterior side of the lens.

In another aspect, the lenses according to the present invention may translate. To obtain such translation, a less "tight" fit to achieve lens translation on the cornea may be achieved by providing the cornea-fitting posterior surface with a larger radius of curvature and/or by providing the cornea-fitting posterior surface with a greater eccentricity. The looseness of the fit may, in certain instances, be increased where a greater add is desired to achieve adequate near vision. The greater the looseness, i.e., the greater the translatability of the lens, generally the larger will be the anterior or lenticular power curve. Where a lens is a relatively fixed simultaneous-vision lens, the central zone is smaller relative to the translating lens.

As described above, the method according to the present invention actually allows a patient the ability to "choose" out of which part of the lens they wish to see. By incorporating the features of the contact lenses according to the present invention, it is now possible to avoid having to fit the patient into a set or established position, thus obviating one of the more difficult problems of bifocal/multifocal contact lens fitting. Instead, in the present invention, the fit or position of the lens is first established naturally and thereafter, the visual characteristics of the lens are designed into the finished lens.

A multifocal contact lens customized for a patient comprises, in accordance with the present invention, an annular portion with an aspheric annular cornea-fitting posterior surface having a standardized eccentricity, an edge bevel at an annular periphery of the annular portion, and a central portion connected to the annular portion. The central portion has a concave aspherical posterior surface of a standardized eccentricity and also has a convex anterior surface with an aspheric power curve customized to the patient. A transition surface connects the cornea-fitting posterior surface and the concave aspherical posterior surface, the transition surface having a gradual change in curvature.

According to another feature of the present invention, the concave aspherical posterior surface has an eccentricity between about 0.6 and about 1.5 and the aspheric annular cornea-fitting posterior surface has an eccentricity between about 0.4 and about 0.8. Where the concave aspherical posterior surface and the aspheric annular cornea-fitting posterior surface have the same eccentricity, they preferably have the same radius of curvature.

According to a further feature of the present invention, the aspheric annular cornea-fitting posterior surface is fit flat relative to the wearer's cornea, whereby the lens can translate on the cornea. To achieve this translation, the standardized eccentricity of the cornea-fitting posterior surface may be increased or alternatively, the radius of curvature of the cornea-fitting posterior surface may be increased.

Alternatively conceptualized, in certain embodiments, the annular portion of the lens has an outer edge formed so as to be effectively entrainable by a patient's eyelid to shift the lens relative to the patient's eye to vary which portion of the power curve is used during vision.

Another multifocal contact lens customized for a patient comprises, in accordance with the present invention, an annular portion with an aspheric annular cornea-fitting posterior surface having a standardized eccentricity, an edge bevel at an annular periphery of the annular portion, and a central portion connected to the annular portion, the central portion having a concave aspherical posterior surface of a standardized eccentricity and a convex anterior surface. The anterior surface has a central power curve and a lenticular power curve of different powers both customized to the patient. A transition surface connects the cornea-fitting posterior surface and the concave aspherical posterior surface, the transition surface having a gradual or minor change in curvature to minimize friction with the cornea.

As set forth above, the concave aspherical posterior surface may have an eccentricity between about 0.6 and about 1.5 (preferably less than about 1.0 within this range), while the aspheric annular cornea-fitting posterior surface has an eccentricity between about 0.4 and about 1.0, and preferably about 0.4 to about 0.8 within this range. Where the concave aspherical posterior surface and the aspheric annular cornea-fitting posterior surface have the same eccentricity, preferably, they have the same radius of curvature.

The aspheric annular cornea-fitting posterior surface may be flat relative to the wearer's cornea to enable translation of the lens on the cornea.

A method for use in preparing a customized multifocal contact lens comprises, in accordance with the present invention, the steps of (a) providing a standard diagnostic contact lens having an annular portion with a concave cornea-fitting posterior surface, the diagnostic contact lens also having a central portion with a predetermined convex anterior surface and a concave aspherical posterior surface of predetermined eccentricity, (b) placing the diagnostic contact lens on the cornea of a patient's eye so that the fitting surface is in substantial contact with the cornea, (c) allowing the diagnostic contact lens to align itself with the cornea in an off-center position while the patient looks at an effectively distant object, (d) upon aligning of the diagnostic contact lens in the off-center position, disposing a series of test lenses before the patient's eye to determine a first portion of a power curve with which the anterior surface of the central portion could be formed to provide optimal far vision for the patient, and (e) while the patient looks at an effectively near object, disposing another series of test lenses before the patient's eye to determine a second portion of a power curve with which the anterior surface of the central portion could be formed to provide optimal near vision for the patient.

According to another feature of the present invention, the step of providing a standard diagnostic contact lens includes the steps of (f) providing a plurality of standard diagnostic contact lenses each having an annular portion with a concave cornea-fitting posterior surface, the diagnostic contact lenses each having a central portion with a predetermined convex anterior surface and a concave aspherical posterior surface of a respective predetermined eccentricity, and (g) selecting one of the standard diagnostic contact lenses.

A multifocal contact lens customized for a patient comprises, in accordance with the present invention, (i) an annular portion with an aspheric annular cornea-fitting posterior surface having a standardized eccentricity between about 0.4 and about 0.8, (ii) an edge bevel at an annular periphery of the annular portion, (iii) a central portion connected to the annular portion, the central portion having a concave aspherical posterior surface of a standardized eccentricity between about 0.6 and 1.50, the central portion also having a convex anterior surface with a power curve customized to the patient, and (iv) a transition surface connecting the cornea-fitting posterior surface and the concave aspherical posterior surface, the transition surface having a gradual change in curvature.

The instant invention recognizes the difficulty of centering contact lenses. However, instead of struggling to achieve corneal centering, as some fitting techniques attempt, the instant method obviates the difficulty by assuming that the greatest majority of fitted multifocal lenses will not be centered on the cornea at all. In a method in accordance with the present invention, the diagnostic lens positions itself in its natural position. Because the finished lens has virtually the same exact back surface design as the diagnostic lens, there is no need to center either the diagnostic lens or the finished product, which should position the same way as the diagnostic lens.

The present invention recognizes that each cornea is different and, instead of molding or fitting a lens precisely to center on the eye, the instant contact lens preparation technique selects among a fixed number of prescribed standard fitting or diagnostic lenses and then modifies the anterior surface only in order to achieve an optimal multifocal vision, while maintaining approximately the same thickness and edge. This method can change differential powers of the two aspheric zones without appreciably affecting the fit.

Because the central zone of a lens manufactured in accordance with the present invention is aspheric, it has a multiplicity of refractive powers. These powers are least plus or most minus at the vertex and progressively become more plus or less minus from the vertex to the end of the central zone.

Whenever one refracts over such a lens on the eye using spherical ophthalmic lenses, the patient subjectively chooses that ophthalmic lens power combined with the multiplicity of lens powers in the aspheric central zone of the contact lens which provides the best acuity of vision at both far distance and near distance. There is a cortical interpretation of the independent images to determine the best acceptable summation of images.

The present invention is useful with standard contact lens materials, i.e. rigid (gas permeable or PMMA) and soft (hydrogel) polymeric materials which are used to manufacture contact lenses.

DETAILED DESCRIPTION

Figure 2:
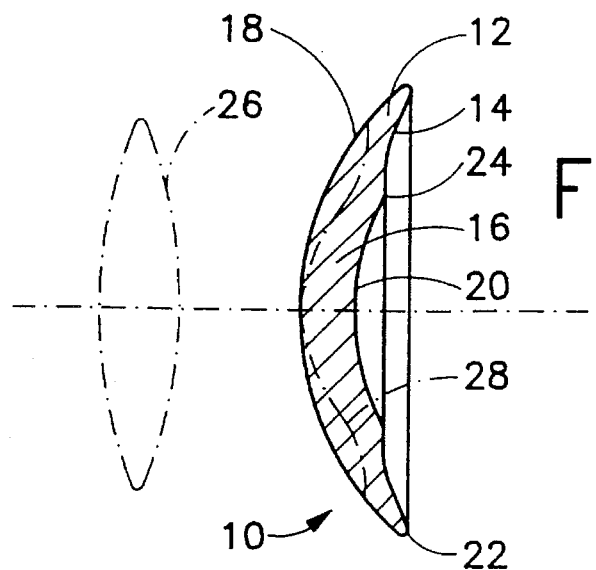
FIG. 2 is a cross-sectional view taken along line II—II in FIG. 1, showing in phantom lines an ophthalmic lens positioned in front of the diagnostic lens for fitting purposes.
Figure 1:
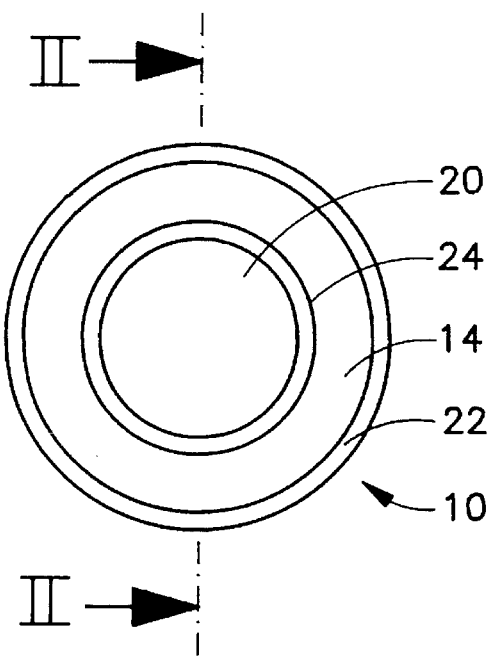
FIG. 1 is a schematic rear elevational view of a diagnostic contact lens for use in fitting a patient with a simultaneous type multifocal contact lens, in accordance with the present invention.

In preparing a customized multifocal contact lens, a standard diagnostic contact lens 10 as illustrated in FIGS. 1 and 2 is first placed on the patient's eye and allowed to seat itself in a natural, generally off-center, position. An over-refraction is then performed to determine a power curve for the lens. The power curve is provided by modifying the anterior surface of a finished prescription lens having the same posterior surfaces as the diagnostic lens 10. In many cases, the anterior surface of the lens will have only one power curve. In other cases, the anterior surface may have more than one, and preferably two, power curves.

Figure 4:
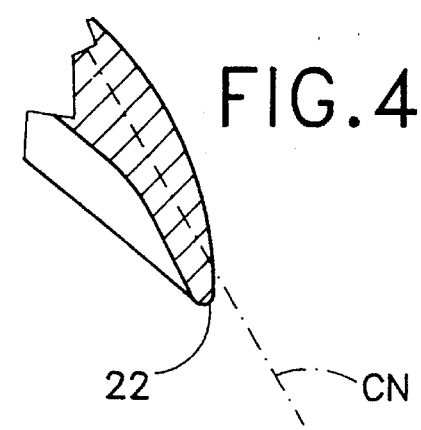
FIG. 4 is a partial cross-sectional view, on an enlarged scale, of the ophthalmic lens of FIGS. 1 and 2, showing an edge bevel.

As shown in FIG. 1 and 2, a first diagnostic lens 10 tried on the patient has an annular portion 12 with a concave cornea-fitting posterior surface 14. Lens 10 also has a central portion 16 with a predetermined convex anterior surface 18 and a concave aspherical posterior surface 20 of predetermined eccentricity. Generally, this first diagnostic lens has at an annular periphery of annular portion 12, and a standard edge bevel 22 (FIGS. 2 and 4) which is turned to the side of a center line CN. Accordingly, the annular portion 12 of the lens is designed to maintain the shape and thickness of the diagnostic lens so that it will fit in the same manner as the prescription lens.

In fitting a patient with a multifocal or multifocal contact lens, diagnostic lens 10 is placed on the cornea of the patient's eye so that cornea-fitting posterior surface 14 is in substantial contact with the cornea. Lens 10 is allowed to align itself with the cornea in an off-center position. Upon an alignment of diagnostic contact lens 10 in the off-center position, a series of conventional spherical ophthalmic test lenses 26 (FIG. 2) are disposed before the lens 10 on the patient's eye to determine a power curve 28 (FIG. 1) with which anterior surface 18 of central portion 16 can be formed to provide optimal near and far vision for the patient.

To optimize the fitting of lens 10 to any particular patient's cornea, lens 10 is first selected from a kit of standard diagnostic contact lenses, such as lens 10, each having annular portion 12 with concave cornea-fitting posterior surface 14. Each lens 10 also has central portion 16 with predetermined convex anterior surface 18 and concave aspherical posterior surface 20 of predetermined eccentricity between approximately 0.60 and approximately 1.50 and preferably between approximately 0.6 and 1.0. The annular portion 12 of each diagnostic lens 10 in the kit has a respective concave profile different from the profiles of the other lenses in the diagnostic or fitting kit.

Most of the lenses 10 in the kit have cornea-fitting posterior surfaces 14 which are aspherical with eccentricities between about 0.4 and about 0.8. The radii of curvature and eccentricities may vary so as to provide the practitioner with adequate flexibility in fitting a lens to a patient's cornea.

It is possible for a diagnostic lens to have the same eccentricity, e.g., 0.8, in the concave aspherical posterior surface 20 and cornea-fitting posterior surface 14. In such a case, the surfaces 14 and 20 may have different radii of curvature to facilitate matching to patients' corneas. Preferably, however, surfaces 14 and 20 have the same radii of curvature. In such a case, surfaces 14 and 20 merge and form one aspheric posterior surface for the lens.

The patient is fitted first with a diagnostic or fitting contact lens 10 having a posterior surface 14 which substantially matches the cornea of the patient about the iris.

Two or more different standard diagnostic contact lenses 10 may be tested on the cornea of the patient to determine which has the most appropriate cornea-fitting surface 14. Upon the selection of a suitable diagnostic lens 10, an over-refraction procedure is performed to determine an appropriate power curve 28 for the final lens. This over-refraction procedure is performed with the patient focusing on a distant object. Subsequently, upon the determination of an appropriate distant vision power curve, the near vision of the patient is tested, using, for example, an over-refraction procedure. In the event that the patient's near vision is inadequate, another diagnostic lens 10 may be selected which seats differently on the cornea so that the patient looks through a different part of the lens during near vision, for example, through an edge of the central portion of the lens or even through the annular portion of the lens. An over-refraction is again performed to determine a power curve 28 for the newly selected diagnostic lens.

If this procedure is determined to be ineffective in providing the patient with both acceptable distance vision as well as acceptable near vision, which most frequently happens in older patients, then two alternative procedures are available for providing a prescription lens with acceptable near vision as well as acceptable distance vision.

In one procedure, the patient continues to wear the same diagnostic lens or another diagnostic lens 10 of the simultaneous-vision type, i.e., with a relatively tight-fitting periphery. A second over-refraction, on the patient's near vision, is performed to determine a second portion of the power curve for a lenticular portion of the lens. Accordingly, a resulting simultaneous-vision-type multifocal contact lens for the patient has two power curves on the anterior side of the lens. The power curves are spherical surfaces with different radii of curvature.

In the other procedure, the prescription lens of the patient is provided on the anterior side with an aspheric power curve, rather than a conventional (spherical) power curve. Generally, an aspheric power curve will have an eccentricity less than about 0.6 and possibly as little as 0.1. This solution gives the patient a greater "add" in a peripheral area of the lens through which the patient looks for near vision. The eccentricity of the aspheric power curve is selected to provide the proper "add" determined by over-refracting for distance vision and near vision.

In order to secure acceptable distance vision and near vision in a multi-focal contact lens pursuant to the above-described procedure, particularly where there is a significant difference in "add" between the prescription or power curve for distance vision and the prescription or power curve for near vision, the lens may be formed to float or translate on the cornea to an extent greater than normal. In the case of a contact lens having an aspheric power curve, a steeper part of the power curve may be shifted over the pupil for near vision. In the case of a lens with a second, lenticular power curve, minor translation of the lens may serve to shift the lenticular area more squarely over the pupil for near vision.

Figure 3:
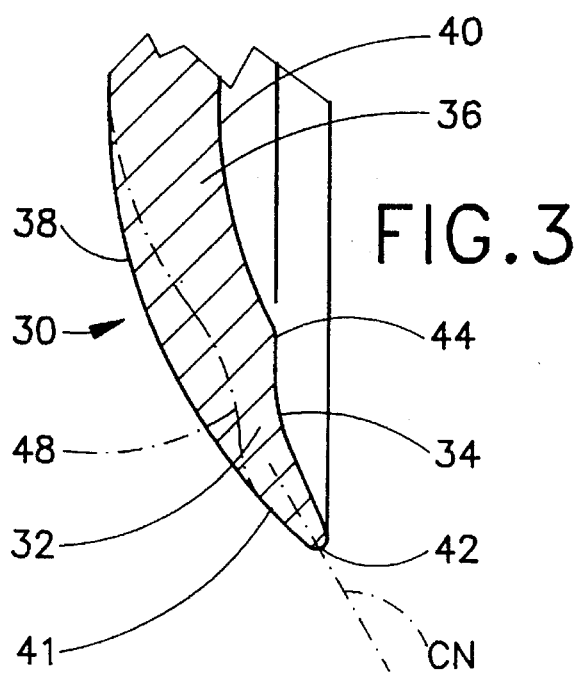
FIG. 3 is a partial cross-sectional view of another diagnostic contact lens in accordance with the present invention, for use in fitting a patient with a relatively translating type multifocal contact lens, in accordance with the present invention.

To provide such a translating or floating type prescription lens, a translating or floating type diagnostic lens 30 (FIG. 3) is selected from a kit of such lenses. Lens 30 has an annular portion 32 with a concave cornea-fitting posterior surface 34. Lens 30 also has a central portion 36 with a predetermined convex anterior surface 38 and a concave aspherical posterior surface 40 of predetermined eccentricity.

Lenses 30 are floating lenses by virtue of having a flatter cornea-fitting posterior surface 34, which diverges more from the cornea. Such flatness or divergence may be obtained by either increasing the radius of curvature and/or increasing the eccentricity of the cornea-fitting posterior surface 34. Alternatively conceptualized, in contrast to lens 10 which has, at an annular periphery of annular portion 12, edge bevel 22 (FIGS. 2 and 4) which is turned to the side of a center line CN, annular portion 32 of lens 30 (FIG. 3) has an annular outer edge 41 with a centralized apex 42. Apex 42 lies along the center line CN' of outer edge 41 and thereby effectively provides annular portion 32 at outer edge 41 with an edge which is relatively flat and angled outwardly from the cornea.

The flattened or outwardly angled peripheral edge 41 of annular portion 32 may be entrainable by a patient's eyelid to shift lens 30 relative to the patient's eye. Where a finished or fitted lens having the same posterior surfaces as lens 30 is placed on a patient's eye, the shifting of the fitted lens serves to vary which portion of a power curve 48 is used during vision. Viewing an object through a different portion of the power curve 48 serves to vary the add to differentially accommodate distance vision and near vision. Power curve 48 may be a single spheric or aspheric surface, or a plurality of surfaces.

The eccentricity of aspherical posterior surface 40 of central portion 36 is preferably between approximately 0.4 and approximately 1.0. Accordingly, the aspherical posterior surface 40 has the profile of an ellipse (rather than a parabola, where the eccentricity is greater than 1.0). Concomitantly, cornea-fitting posterior surface 34 is aspherical with an eccentricity greater than about 0.4 and preferably greater than about 0.5.

A smooth or gradually changing transition junction 44 formed along cornea-fitting posterior surface 34 of annular portion 32 is connected to aspherical posterior surface 40 of central portion 36. At the transition junction 44, the radii of curvature of cornea-fitting posterior surface 34 of annular portion 32 and aspherical posterior surface 40 of central portion 36 are approximately equal. However, the eccentricities of those aspheric posterior surfaces remain different.

Fitting a patient with a relatively translating type bifocal or multifocal contact lens requires essentially the same steps as fitting a patient with a relatively simultaneous-vision lens having a single power curve. Diagnostic lens 30 is first placed on the cornea of the patient's eye so that cornea-fitting posterior surface 34 is in substantial contact with the cornea. Lens 30 is allowed to align itself with the cornea in an off-center position. Upon an alignment of diagnostic contact lens 30 in the off-center position, a series of conventional spherical opthalmic test lenses (not shown) are disposed before the lens 30 on the patient's eye to determine a power curve 48 with which anterior surface 38 of central portion 36 can be formed to provide optimal near and far vision for the patient.

To optimize the fitting of lens 30 to any particular patient's cornea, lens 30 is selected from a kit of standard diagnostic contact lenses, such as lens 30, each having annular portion 32 with concave cornea-fitting posterior surface 34. Each lens 30 also has central portion 36 with predetermined convex anterior surface 38 and concave aspherical posterior surface 40 of predetermined eccentricity between approximately 0.4 and approximately 1.0. The annular portion 32 of each diagnostic lens 30 in the kit has a respective concave profile different from the profiles of the other lenses in the diagnostic or fitting kit. Most of the lenses 30 in the kit have cornea-fitting posterior surfaces 34 which are aspherical with eccentricities greater than about 0.4 (preferably greater than about 0.5).

It is to be noted that the edge formed by the centralized apex 42 of edge 41 may be provided only along an upper rim of the lens 30. However, to ensure adequate floating of the lens on the cornea, it is preferred that the eccentricity of concave cornea-fitting posterior surface 34 remain the same throughout. In general, the eccentricity of concave cornea-fitting posterior surface 34 is generally less than the eccentricity of concave aspherical posterior surface 40 of central portion 36. However, it is possible for the eccentricities of cornea-fitting posterior surface 34 and the eccentricity of concave aspherical posterior surface 40 of central portion 36 to be the same, or, in rare instances greater, with cornea-fitting posterior surface 34 having a greater radius of curvature, thereby providing a relatively floating, translating capability.

Where a patient is to be fitted with a simultaneous type bifocal contact lens, the eccentricity of aspherical posterior surface 20 of central portion 16 is preferably between approximately 0.6 and approximately 1.5. In such a simultaneous type bifocal contact lens, cornea-fitting posterior surface 14 may be aspherical with an eccentricity between about 0.4 and about 0.8.

Lens 10 additionally has a transition junction 24 where the central zone connecting cornea-fitting posterior surface 14 of annular portion 12 and aspherical posterior surface 20 of central portion 16 meet. At the transition junction 24, the radii of curvature of cornea-fitting posterior surface 14 of annular portion 12 and aspherical posterior surface 20 of central portion 16 are approximately equal. However, the eccentricities of those aspheric posterior surfaces remain different.

An eccentricity between about 0.40 and about 1.0 (preferably less than 0.8 within this range) for cornea-fitting posterior surface 14 of a simultaneous-type vision diagnostic lens or a finished prescription lens is in accordance with the aspheric topographical characteristics of the human cornea. With such an eccentricity, cornea-fitting posterior surface 14 is fitted relatively aligned to the patient's cornea, so that the lens, which moves slightly with eye and eyelid movement, does not move significantly with movement of the upper eyelid.

Upon the completion of the over-refraction process, the patient is fitted with a prescription lens (generally, from a lens production laboratory) which is substantially identical to the finally used diagnostic lens 10 or 30. The lens may have a single spheric or aspheric power curve or, in the case where additional add is needed, two power curves. The anterior surface of the selected lens blank is machined or, more specifically, lathed to produce the appropriate power curve 28 or 48. Alternatively, either the posterior or anterior surface of the lens or the entire lens, including posterior and anterior surfaces, may be molded.

A customized or fitted simultaneous type bifocal or multifocal contact lens made in accordance with the lens manufacturing detailed above is substantially identical to a selected diagnostic lens 10 or 30 used on the patient, except that the anterior surface 18 or 38 of the customized bifocal contact lens has a power curve 28 or 48 determined by the fitting process where the diagnostic lens 10 or 30 is allowed to align itself with the cornea in an off-center position and where a series of conventional spherical opthalmic test lenses 26 are disposed before the off-center diagnostic lens 10 or 30 on the patient's eye to determine power curve 28 or 48.

In most cases, over-refraction of the simultaneous vision lens or a translating lens will provide adequate vision for both near and far distances. In such a case, a simultaneous or translating lens having an anterior surface with a single power curve may be used with good success.

In certain instances, as described above, where the patient requires more of an "add" to obtain adequate near vision correction, a lenticular area of the lens may be provided with a second power curve for near vision correction. In this case, a second over-refraction procedure is performed using the same diagnostic lens.

In a translating type multifocal contact lens made in accordance with the present invention, cornea-fitting posterior surface 34 of annular portion 32 is generally flatter than concave aspherical posterior surface 40 of central portion 36. This relative flatness facilitates the floating of the lens and entrainment thereof by the upper eyelid. Cornea-fitting posterior surface 34 of annular portion 32 may have curves parallel to the cornea, but no curves should be steeper, to prevent locking or fixing of the lens onto the cornea. In addition, the thickness of the outer edge 41 should be at least approximately 0.08 to 0.12 mm, while the eccentricity of central concave aspherical posterior surface 40 should be less than about 1.5 and preferably less than about 1.0. Translating lenses in accordance with the present invention preferably ride high on the eye and may be shifted upwardly by the upper eyelid for near vision.

A simultaneous vision lens made in accordance with the present invention has a peripheral or annular region which has a lower eccentricity than the central aspheric surface. The peripheral aspheric surface should be aligned with the cornea, while the edge should be approximately 0.08 to 0.12 mm thick. The eccentricity of the central concave aspherical posterior surface should be less than about 1.5, and preferably should range from about 0.6 to about 1.0.

As described hereinabove, the method according to the present invention actually allows a patient the ability to "choose" out of which part of the lens they wish to see, rather than to force a fit on the patient. By incorporating the features of the contact lenses according to the present invention, it is now possible to avoid having to fit the patient in a set or established position, thus obviating one of the more difficult problems of bifocal/multifocal contact lens fitting. Instead, in the present invention, the fit or position of the lens is first established naturally and thereafter, the visual characteristics of the lens are designed into the finished lens.

Generally, as is well known in the art, if the anterior power curve is decreased by approximately 12 lines for each diopter, the add is 1.0. A decrease of approximately 6 lines for each ½ diopter results in an add of 0.5, while a decrease of approximately 24 lines for each 2 diopters results in an add of 2.0. Similarly, a decrease of approximately 48 lines for each 4 diopters results in an add of 4.0.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are profferred by way of example to facilitate comprehension of the invention and should not be construed to limit the scope thereof.

What is claimed is:

1. A multifocal contact lens customized for a patient, comprising:

an annular portion with an aspheric annular cornea-fitting posterior surface having a standardized eccentricity;

an edge bevel at an annular periphery of said annular portion;

a central portion connected to said annular portion, said central portion having a concave aspherical posterior surface of a standardized eccentricity, said central portion also having a convex anterior surface with an aspheric power curve customized to the patient; and a transition surface connecting said cornea-fitting posterior surface and said concave aspherical posterior surface.

2. The lens defined in claim 1 wherein said concave aspherical posterior surface has an eccentricity between about 0.6 and about 1.5 and wherein said aspheric annular cornea-fitting posterior surface has an eccentricity between about 0.4 and about 0.8.

3. The lens defined in claim 2 wherein said concave aspherical posterior surface and said aspheric annular cornea-fitting posterior surface have the same eccentricity and radius of curvature.

4. The lens defined in claim 1 wherein said aspheric annular cornea-fitting posterior surface is flat relative to the wearer's cornea, whereby the lens translates relatively easily on the cornea.

5. The lens defined in claim 1 wherein said aspheric annular cornea-fitting posterior surface is generated by a larger radius of curvature than said concave aspherical posterior surface, whereby the lens translates relatively easily on the cornea.

6. The lens defined in claim 1 wherein the lens has an outer edge formed so as to be effectively entrainable by a patient's eyelid to shift the lens relative to the patient's eye to vary which portion of said power curve is used during vision.

7. The lens defined in claim 6 wherein the lens has an outer edge with a centralized apex.

8. The lens defined in claim 1 wherein said transition surface has a gradual or minor change in curvature.

9. The lens defined in claim 1, further comprising a blend curve between said annular portion and said edge bevel.

10. A multifocal contact lens customized for a patient, comprising:

an annular portion with an aspheric annular cornea-fitting posterior surface having a standardized eccentricity;

an edge bevel at an annular periphery of said annular portion;

a central portion connected to said annular portion, said central portion having a concave aspherical posterior surface of a standardized eccentricity, said central portion also having a convex anterior surface with a central power curve and a lenticular power curve of different powers both customized to the patient; and a transition surface connecting said cornea-fitting posterior surface and said concave aspherical posterior surface, said transition surface having a gradual change in curvature.

11. The lens defined in claim 10 wherein said concave aspherical posterior surface has an eccentricity between about 0.6 and about 1.5 and wherein said aspheric annular cornea-fitting posterior surface has an eccentricity between about 0.4 and about 0.8.

12. The lens defined in claim 11 wherein said concave aspherical posterior surface and said aspheric annular cornea-fitting posterior surface have the same eccentricity and radius of curvature.

13. The lens defined in claim 10 wherein said aspheric annular cornea-fitting posterior surface is flat relative to the wearer's cornea, whereby the lens translates on the cornea.

14. The lens defined in claim 10 wherein said annular portion has an outer edge formed so as to be effectively entrainable by a patient's eyelid to shift the lens relative to the patient's eye to vary which portion of said power curve is used during vision.

15. The lens defined in claim 14 wherein said annular portion has an outer edge with a centralized apex.

16. A method for use in preparing a customized multifocal contact lens, comprising the steps of:

providing a standard diagnostic contact lens having an annular portion with a concave cornea-fitting posterior surface, said diagnostic contact lens also having a central portion with a predetermined convex anterior surface and a concave aspherical posterior surface of predetermined eccentricity;

placing said diagnostic contact lens on the cornea of a patient's eye so that said fitting surface is in substantial contact with the cornea;

allowing said diagnostic contact lens to align itself with the cornea in an off-center position while the patient looks at an effectively distant object;

upon aligning of said diagnostic contact lens in said off-center position, disposing a series of test lenses before the patient's eye to determine a first portion of a power curve with which said anterior surface of said central portion could be formed to provide optimal far vision for the patient; and while the patient looks at an effectively near object, disposing another series of test lenses before the patient's eye to determine whether said anterior surface of said central portion should be formed with a second portion of a power curve to provide optimal near vision for the patient.

17. The method defined in claim 16 wherein said step of providing a standard diagnostic contact lens includes the steps of:

providing a plurality of standard diagnostic contact lenses each having an annular portion with a concave cornea-fitting posterior surface, said diagnostic contact lenses each having a central portion with a predetermined convex anterior surface and a concave aspherical posterior surface of a respective predetermined eccentricity; and selecting one of said standard diagnostic contact lenses.

18. The method defined in claim 17 wherein the concave cornea-fitting posterior surface of each of said plurality of standard diagnostic contact lenses is aspherical.

19. The method defined in claim 18 wherein the concave cornea-fitting posterior surfaces of said standard contact lenses have an eccentricity greater than about 0.4.

20. A multifocal contact lens customized for a patient, comprising:

an annular portion with an aspheric annular cornea-fitting posterior surface having a standardized eccentricity between about 0.4 and about 0.8;

an edge bevel at an annular periphery of said annular portion;

a central portion connected to said annular portion, said central portion having a concave aspherical posterior surface of a standardized eccentricity between 0.6 and 1.50, said central portion also having a convex anterior surface with a power curve customized to the patient; and a transition surface connecting said cornea-fitting posterior surface and said concave aspherical posterior surface.

21. The lens defined in claim 20 wherein said convex anterior surface is formed with an aspheric power curve.

22. The lens defined in claim 20 wherein said transition surface has a gradual or minor change in curvature.

23. The lens defined in claim 20, further comprising a blend curve between said annular portion and said edge bevel.

24. A multifocal contact lens customized for a patient, comprising:

a central portion having a concave aspherical posterior surface of a standardized eccentricity, said central portion also having a convex anterior surface with a power curve customized to the patient; and an annular portion connected to said central portion, said annular portion being provided with an aspheric annular cornea-fitting posterior surface, said annular portion having an outer edge formed so as to be effectively entrainable by a patient's eyelid to shift the lens relative to the patient's eye to vary which portion of said power curve is used during vision.

25. A multifocal contact lens customized for a patient, having an annular cornea fitting posterior surface and a concave aspheric posterior surface with a standardized eccentricity, a convex anterior surface with a power curve customized to the patient, and a transition surface connecting said cornea-fitting posterior surface and said concave aspherical posterior surface.

26. The lens defined in claim 25 wherein said power curve is aspheric.

27. The lens defined in claim 26 wherein said power curve has an eccentricity between 0 and 0.6.

28. The lens defined in claim 25 wherein said convex anterior surface has a central zone with said power curve, said anterior surface having a lenticular area with an additional power curve different from the power curve of said central zone.

29. The lens defined in claim 25 wherein said transition surface has a gradual or minor change in curvature.

* * * * *